US006970145B1

(12) United States Patent
Aoki

(10) Patent No.: US 6,970,145 B1
(45) Date of Patent: Nov. 29, 2005

(54) METHOD AND APPARATUS FOR CONTROLLING IMAGE-DISPLAY DEVICES COLLECTIVELY

(75) Inventor: Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 27 days.

(21) Appl. No.: 09/714,154

(22) Filed: Nov. 17, 2000

(30) Foreign Application Priority Data

Nov. 19, 1999 (JP) .............................. 11-330522
Aug. 4, 2000 (JP) ............................. 2000-237462

(51) Int. Cl.[7] .............................. G06F 3/00; G09G 5/00
(52) U.S. Cl. ...................................... 345/1.2; 715/810
(58) Field of Search .......................... 345/1.1–1.3, 4–5, 345/901–905, 502, 2.1–2.3, 3.1; 707/104; 715/716–726, 715/764, 808, 810

(56) References Cited

U.S. PATENT DOCUMENTS

| | | | | |
|---|---|---|---|---|
| 5,467,102 A | * | 11/1995 | Kuno et al. .................. | 345/1.1 |
| 5,923,307 A | * | 7/1999 | Hogle, IV ...................... | 345/4 |
| 5,956,046 A | * | 9/1999 | Kehlet et al. ................ | 345/502 |
| 6,008,807 A | * | 12/1999 | Bretschneider et al. ..... | 345/339 |
| 6,046,709 A | * | 4/2000 | Shelton et al. ............... | 345/1.1 |
| 6,104,414 A | * | 8/2000 | Odryna et al. ................ | 345/1.1 |
| 6,128,629 A | * | 10/2000 | Bretschneider et al. ..... | 707/203 |
| 6,222,507 B1 | * | 4/2001 | Gouko ........................ | 345/1.1 |
| 6,271,805 B1 | * | 8/2001 | Yonezawa .................... | 345/1.1 |
| 6,301,586 B1 | * | 10/2001 | Yang et al. .................. | 707/104 |
| 6,396,500 B1 | * | 5/2002 | Qureshi et al. ............. | 345/473 |
| 6,407,757 B1 | * | 6/2002 | Ho ............................. | 345/702 |
| 6,522,309 B1 | * | 2/2003 | Weber ......................... | 345/1.1 |
| 6,587,082 B1 | * | 7/2003 | Moore ......................... | 345/1.3 |
| 6,670,934 B1 | * | 12/2003 | Muoio et al. ................. | 345/1.1 |

FOREIGN PATENT DOCUMENTS

JP          9-81475         3/1987

\* cited by examiner

*Primary Examiner*—Bipin Shalwala
*Assistant Examiner*—David L. Lewis
(74) *Attorney, Agent, or Firm*—Oblon, Spivak, McClelland, Maier & Neustadt, P.C.

(57) ABSTRACT

An image-transmitting device connected to image-display devices through a bus cable is provided. The image-transmitting device includes a memory unit storing a set of screen data whose correspondence to each of the image-display devices and a displaying order of the screen data to be displayed on the image-display devices are predetermined; a transmission-data-generating unit selecting specific screen data from among the set of the screen data by following the correspondence and the displaying order, and generating transmission data that each of the image-display devices is to display based on the selected specific screen data; a bus interface connected to the image-display devices through the bus cable; and a transmission unit transmitting the transmission data from the bus interface through the bus cable to each of the image-display devices. The image-transmitting device transmits as the screen data, a combination of data specifying an updating area of the screen data displayed on an image-display device and data used for updating part of the screen data displayed in the updating area, to the image-display device through the bus cable, so that the image-display devices can simultaneously update the screen data displayed thereon.

18 Claims, 12 Drawing Sheets

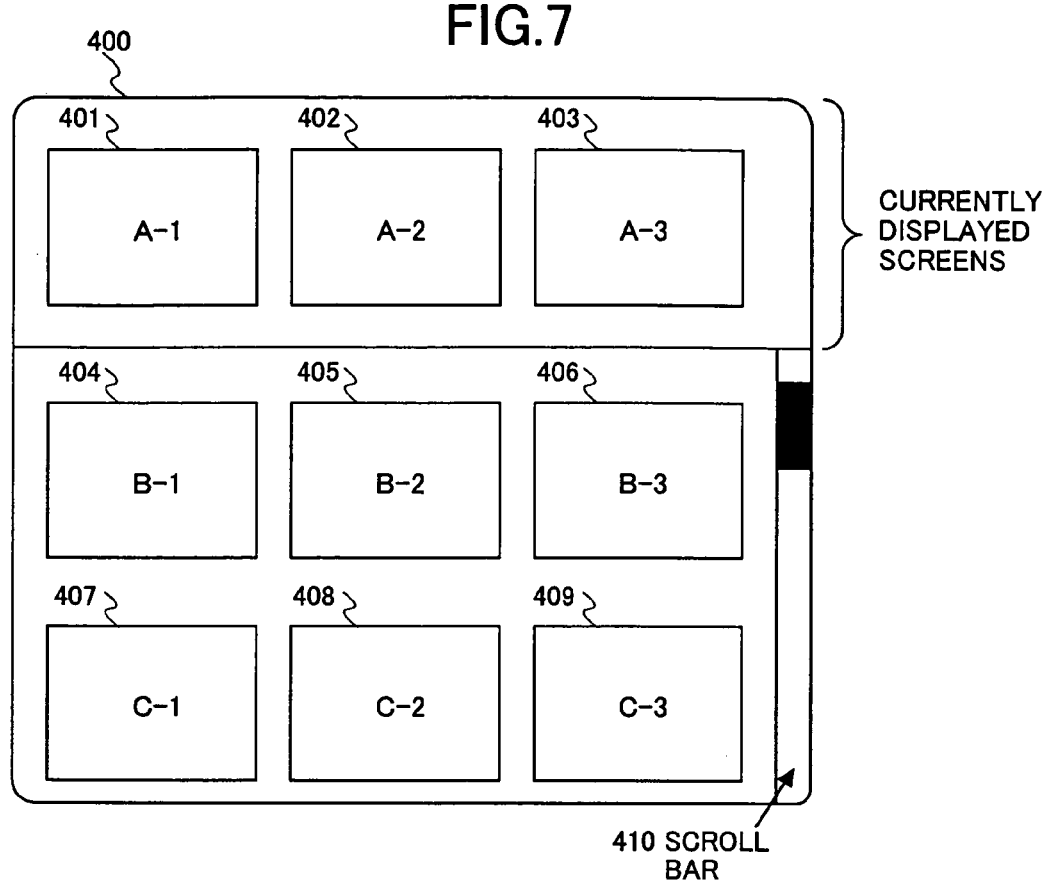
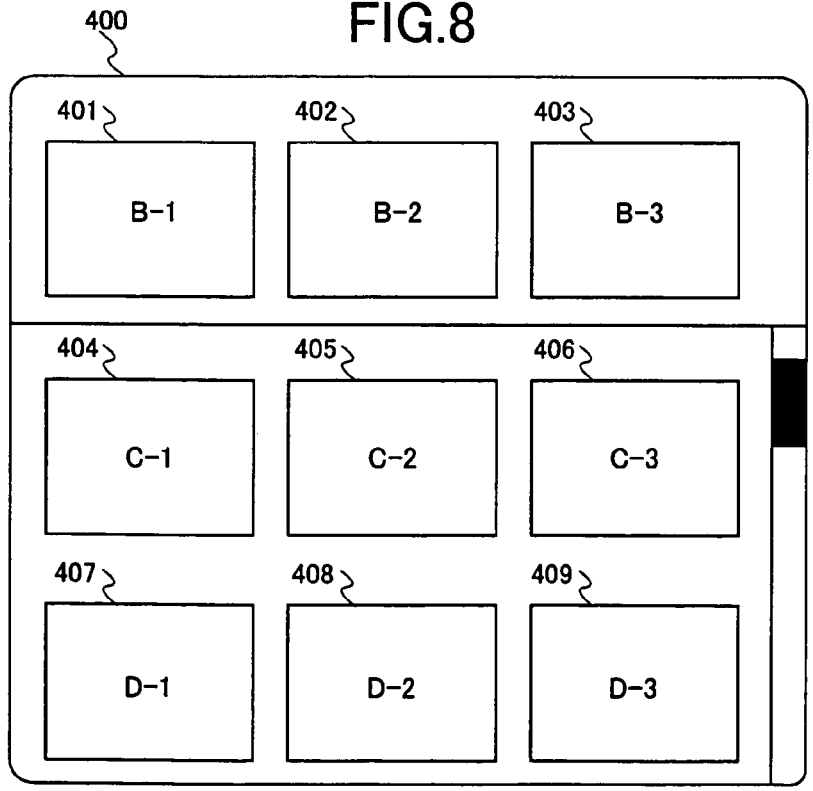

- XY COORDINATES — 501
- WIDTH AND HEIGHT — 502
- DATA TYPE — 503
- DATA LENGTH — 504
- CONTENTS — 505

A B C D E

METHOD AND APPARATUS FOR CONTROLLING IMAGE-DISPLAY DEVICES COLLECTIVELY

BACKGROUND OF THE INVENTION

1. Field of the Invention

The present invention generally relates to an image-display system. The present invention particularly relates to an image-display system that includes image-display devices for displaying a plurality of images simultaneously, and to a user interface provided in an image-display system for allocating a document that includes a plurality of pages to image-display devices included in the image-display system.

2. Description of the Related Art

An image is enlarged by being displayed on a plurality of projectors in a presentation. In addition, a part of the image displayed on each of the projectors can have a high resolution. Further, by setting a plurality of image-display devices on a table, and then displaying images on the image-display devices, more information can be displayed at once on the image-display devices than on a single image-display device. Operation systems such as Windows 98 produced by Microsoft and Mac OS produced by Apple provide a function to use a plurality of image-display devices for displaying images. However, a plurality of video cards 12 must be added to a computer 10, the video cards 12 corresponding to respective image-display devices 14 that are connected to the computer 10 as shown in FIG. 1. Alternatively, special hardware similar to a video card that can connect a plurality of the image display devices 14 must be prepared in addition to the computer 10 and the image-display devices 14.

Additionally, there is software named VNC that displays an image displayed on a monitor of a first computer onto a monitor of a second computer through a network. This VNC is freeware created by Tristan Richard, Quentin Stafford-Fraser, Kenneth R. Wood, and Andy Hooper (Tristan Richard, Quentin Stafford-Fraser, Kenneth R. Wood, Andy Hooper, "Virtual Network Computing", IEEE Internet Computing, Volume 2, Number 1, January/February 1998). The VNC enables fast update of an image displayed on the monitor of the second computer by transmitting raster data of an updated area on the monitor of the first computer and a command to replace a color of an evenly colored area on the monitor of the first computer, to the second computer.

As software installed in an image-display system that includes the computer 10 (a control device) and a plurality of the image-display devices 14, there exists a web browser such as the Internet Explorer produced by Microsoft. The image-display system including the web browser is called a hypertext-document display system, and displays a hypertext document wherein texts, still pictures, movies and sounds included in the document are linked to other related data called objects. The web browser obtains data in an HTML (HyperText Markup Language) format through a network by use of a HTTP protocol, or reads the data from a local disk. Subsequently, the web browser analyzes the obtained data, generates image data indicating contents of the obtained data, and displays the image data on a monitor. The web browser obtains new data in the HTML format from a linked address when a user clicks a mouse in a specific area that has been initially linked to other documents on a monitor, and then displays the new data as an image on the monitor. Additionally, an area called a tool bar provided on an HTML-data display screen displays two buttons, "forward" and "back". The web browser can display the previous pages that have been displayed on the monitor by a user pressing the buttons "forward" and "back".

Another image-display system is a system that uses a plurality of image-display devices. One of methods to use the image-display devices is to divide a large image into images, and then to display the images on the image-display devices. Another method, disclosed in Japanese Laid-Open Patent Application No. 9-81475, is to divide a document logically and then to display logically divided pages of the document. In this method, an LCD (Liquid Crystal Display) board is used as an image-display device. However, a CRT display and a projector may be substituted for the LCD board. Generally, a document includes a set of pages. Assuming each of the pages included in the document is displayed on one of the image-display devices, a user can switch from one page to another page intuitively by observing the pages displayed on the image-display devices simultaneously, or by changing a location of each of the image-display devices physically. A document created by use of a word processor is considered a series of pages in one dimension. The invention disclosed in Japanese Laid-Open Patent Application No. 9-81475 displays a plurality of the pages included in the document simultaneously on the image-display devices by transmitting files that include a plurality of the pages to a group of the image-display devices.

However, in hypertexts such as the HTML, each page includes links connected to other pages in addition to a link to the previous page and a link to the next page. Thus, there exist a plurality of pages connected to each page. In a case in which hypertexts that include complicated links to a plurality of pages are to be displayed on a plurality of image-display devices, a control device included in an image-display system cannot determine which page a user wants to display on each of the plurality of image-display devices only by transmitting the plurality of pages to the plurality of image-display devices. In such an environment, it is necessary to provide a user interface that relates a specific page in a document to a specific image-display device in an image-display system.

SUMMARY OF THE INVENTION

Accordingly, it is a general object of the present invention to provide a method and an apparatus for controlling image-display devices collectively through a user interface to display an image on each of the image-display devices in an image-display system that can be created easily by use of a general personal computer. Another object of the present invention is to provide an image-display system including a control device and image-display devices, wherein the image-display system quickly updates images displayed on the image-display devices even if an interface that connects the control device and the image-display devices is slow.

The above-described objects of the present invention are achieved by an image-transmitting device connected to image-display devices through a bus cable, the image-transmitting device including a memory unit storing a set of screen data whose correspondence to each of the image-display devices and a displaying order of the screen data to be displayed on the image-display devices are predetermined; a transmission-data-generating unit selecting specific screen data from among the set of the screen data by following the correspondence and the displaying order, and generating transmission data that each of the image-display devices is to display based on the selected specific screen data; a bus interface connected to the image-display devices through the bus cable; and a transmission unit transmitting the transmission data from the bus interface through the bus cable to each of the image-display devices.

The image-transmitting device transmits as screen data, a combination of data specifying an updating area of the screen data displayed on an image-display device and data used for updating part of the screen data displayed in the updating area, to the image-display device through the bus cable so that the image-display devices can simultaneously update the screen data displayed thereon.

Other objects, features and advantages of the present invention will become more apparent from the following detailed description when read in conjunction with the accompanying drawings.

BRIEF DESCRIPTION OF THE DRAWINGS

FIG. 7 is a block diagram showing an initial condition of a window used for selecting screen data;

FIG. 8 is a block diagram showing the window used for selecting the screen data after switching screen data displayed on the image-display devices once;

DESCRIPTION OF THE PREFERRED EMBODIMENTS

A description will now be given of preferred embodiments of the present invention, with reference to the accompanying drawings.

Figure 1:
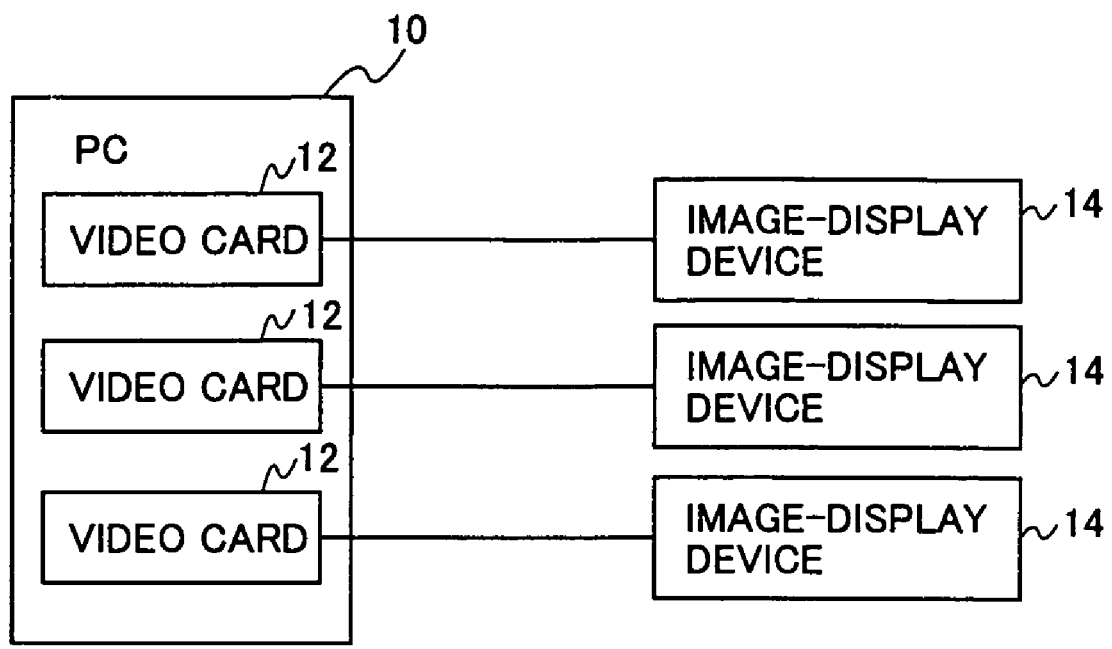
FIG. 1 is a block diagram showing a conventional technology.
Figure 2:
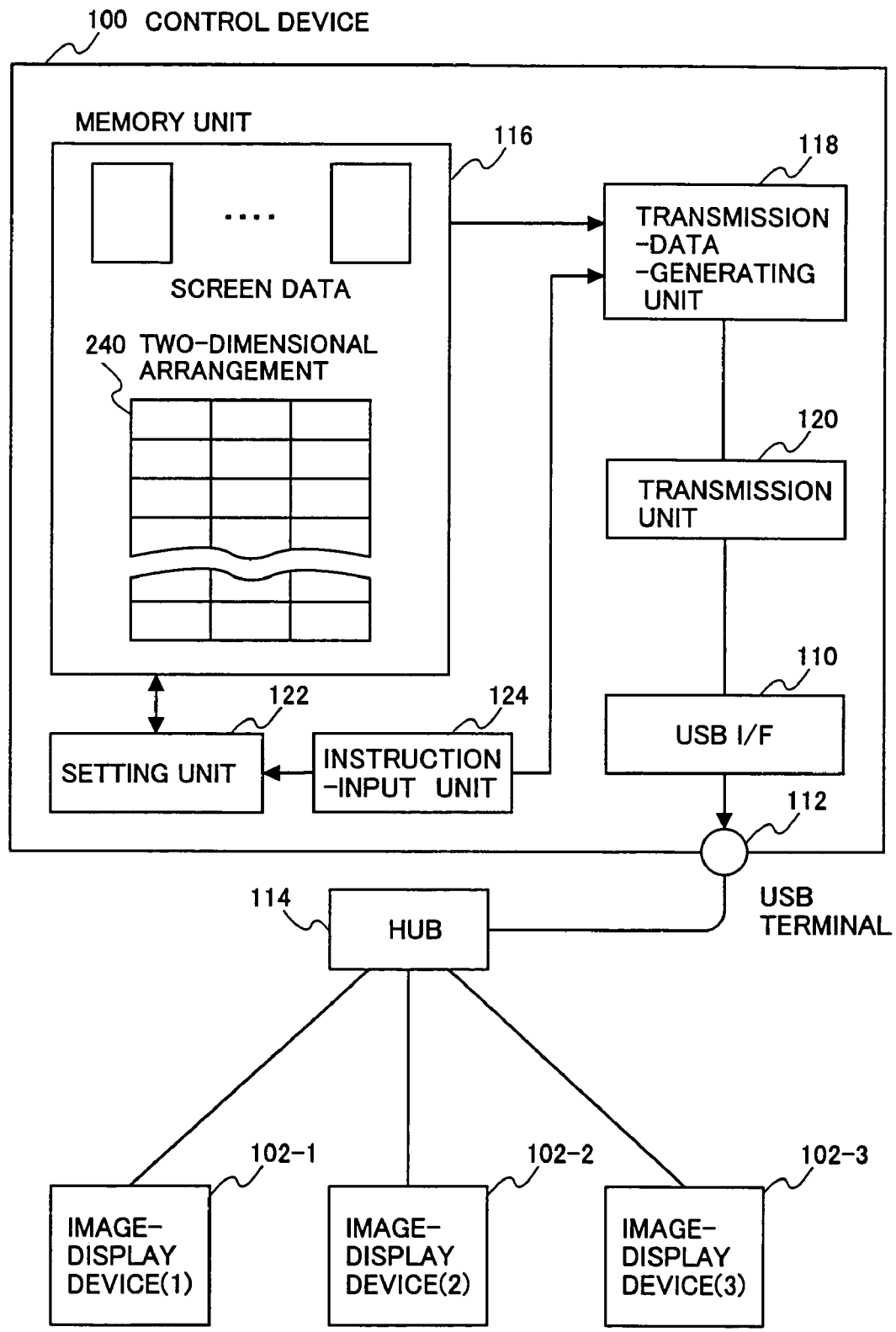
FIG. 2 is a block diagram showing an image-display system according to a first embodiment of the present invention.

FIG. 2 is a block diagram showing an image-display system according to a first embodiment of the present invention. The image-display system includes a control device 100 and a plurality of image-display devices 102. The control device 100 includes a USB (Universal Serial Bus) interface (I/F) unit 110, a USB terminal 112, a memory unit 116, a transmission-data-generating unit 118, a transmission unit 120, a setting unit 122 and an instruction-input unit 124. The control device 100 and the plurality of the image-display devices 102 are connected through a bus interface that can connect a plurality of devices to a single bus. For instance, a USB is used as the bus interface in the image-display system according to the first embodiment. Therefore, the control device 100 includes the USB-interface unit 110 therein as shown in FIG. 2. Additionally, each of the image-display devices 102 includes a USB interface. Considering a function of a USB interface, a HUB 114 being a low-priced line collecting device can be connected to the USB terminal 112 of the control device 100 through a USB cable if the control device 100 is provided with one or more than one USB terminal 112. Additionally, each of the plurality of the image-display devices 102 can be connected to the HUB 114 through a USB cable. Accordingly, the control device 100 and the plurality of the image-display devices 102 can be connected to each other through the USB cable and the HUB 114. It should be noted that the USB interface may be substituted with another bus interface. Additionally, the number of the image-display devices 102 may be altered to any number. However, it is assumed that three image-display devices 102-1, 102-2 and 102-3 are connected to the control device 100 in the first embodiment.

The memory unit 116 provided in the control device 100 stores a group of screen data. An image-display device 102 corresponding to each of the above-described screen data and an order of the above-described screen data to be displayed are predetermined. The transmission-data-generating unit 118 selects screen data from the group of the screen data stored in the memory unit 116 by following the predetermined order of the screen data to be displayed and correspondence of the image-display devices 102 to the screen data, and generates transmission data that is used for displaying an image on a monitor provided in each of the image-display devices 102 based on the selected screen data. The transmission unit 120 transmits the transmission data generated by the transmission-data-generating unit 118 to an image-display device 102 corresponding to the transmission data. The setting unit 122 sets correspondence of the image-display devices 102 to the screen data, and an order of the screen data to be displayed. Additionally, the instruction-input unit 124 is provided in the control unit 100 for a user to input instructions to the setting unit 122 and the transmission-data-generating unit 118 by use of a GUI (Graphical User Interface).

Figure 3:
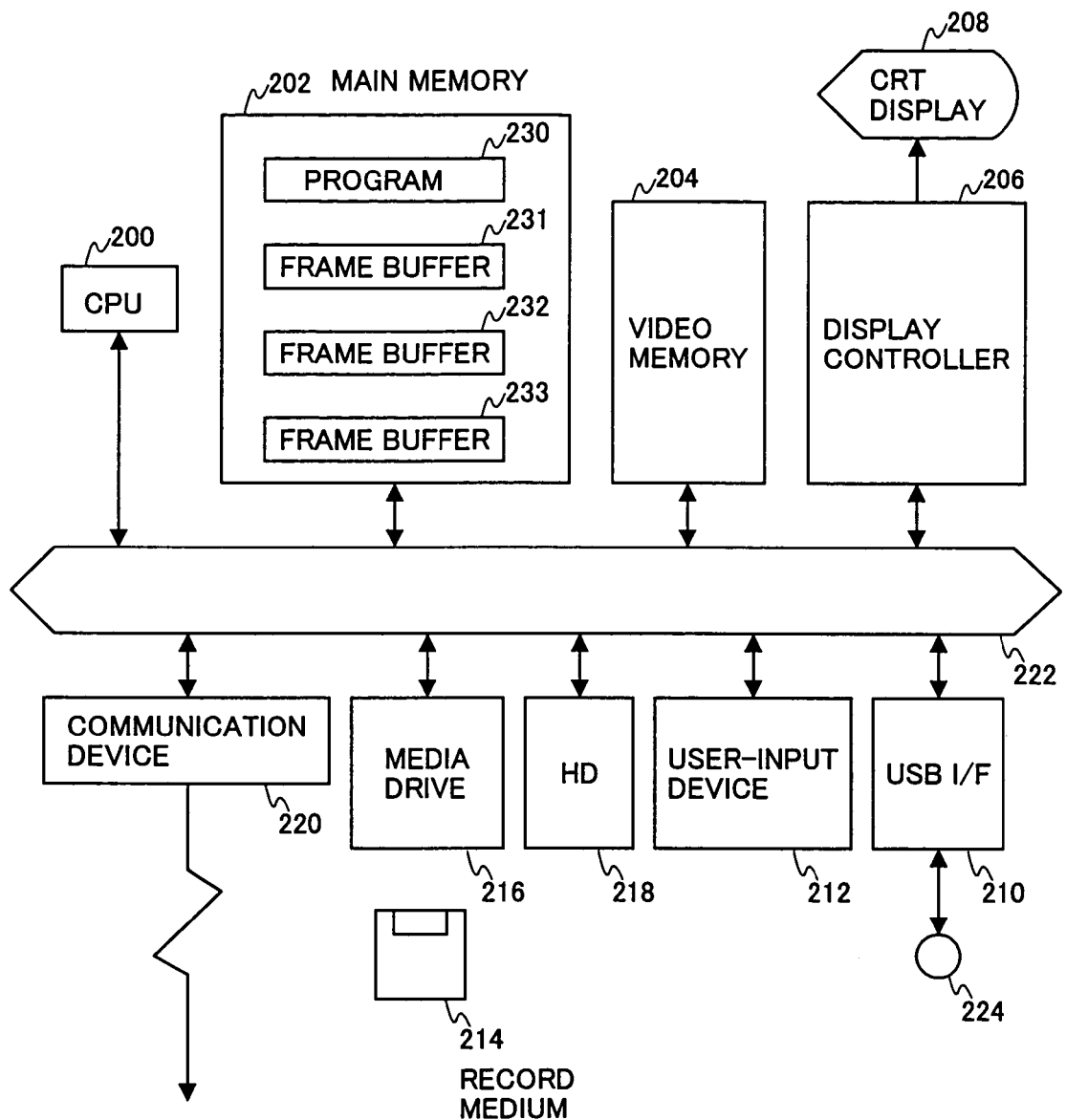
FIG. 3 is a block diagram showing a computer used as a control device provided in the image-display system according to a second embodiment of the present invention.

The above-described control device 100 may be adapted, without adding special hardware, to a computer such as a general personal computer that includes at least one USB terminal, and an information-processing device controlled by a program, for instance. Such a computer used as the control device 100 is shown in FIG. 3 according to a second embodiment of the present invention. The computer shown in FIG. 3 includes a CPU 200, a main memory 202, a video memory 204, a display controller 206, a CRT display 208, a USB-interface circuit 210, a user-input device 212, a record medium 214, a media drive 216, a hard-disk device 218, a communication device 220 and a bus 222. The main memory 202 stores a program 230, and includes frame buffers 231, 232 and 233. The USB-interface circuit is connected to a USB terminal 224. The user-input device 212 includes a keyboard, a mouse, and other pointing devices. The record medium 214 includes a floppy disk, an optical disk and a magneto-optical disk, for example. The it communication device 220 includes a modem. The bus 222 connects each of the above-described units provided in the computer.

Additionally, the program 230 stored in the main memory 202 is controlled by the CPU 200 to execute each function of the control device 100 in the computer shown in FIG. 3. For instance, the program 230 is read from the record medium 214 that contains the program 230, is stored in the main memory 202, and is executed by the CPU 200. The program 230 that has been read from the record medium 214 may be stored temporarily in the hard-disk device 218. In this case, the program 230 is read from the hard-disk device 218, is stored in the main memory 202, and is executed by the CPU 200 if the execution of the program 230 is necessary. Additionally, the program 230 may be stored on a semiconductor ROM that is installed in the computer. It should be noted that various types of record mediums that store the program 230 are included in the present invention. Additionally, the program 230 may be read from other computers through a communication line by use of the communication device 220 of the computer. Programs not shown in FIG. 3 such as an operation system that supplies GUI environments are loaded from the hard-disk device 218 to the main memory 202.

The main memory 202 and any recording area of the hard-disk device 218 are used as the memory unit 116 of the control device 100 in the computer shown in FIG. 3. The user-input device 212 of the computer such as a mouse is used as the instruction-input unit 124 of the control device 100 in a GUI environment. Additionally, the USB-interface circuit 210 and the USB terminal 224 correspond respectively to the USB-interface unit 110 and the USB terminal 112 shown in FIG. 2.

A description will now be given of an operation of the image-display system with reference to FIGS. 2 and 3. Screen data is initially created by use of an editor or an HTML creating tool that is read from the hard-disk device 218 and stored in the main memory 202 for later displaying the screen data on a monitor of each image-display device 102. The created screen data is then stored as a file in the hard-disk device 218. The size of this screen data is equal to a monitor size of each image-display device 102. However, the screen data does not take a format of raster data but HTML (Hypertext Markup Language) data since the HTML data is structural data that indicates figures such as texts and lines so that an area where the figures are depicted can be easily known for generating later-described transmission data more easily than with the raster data.

Figure 4:
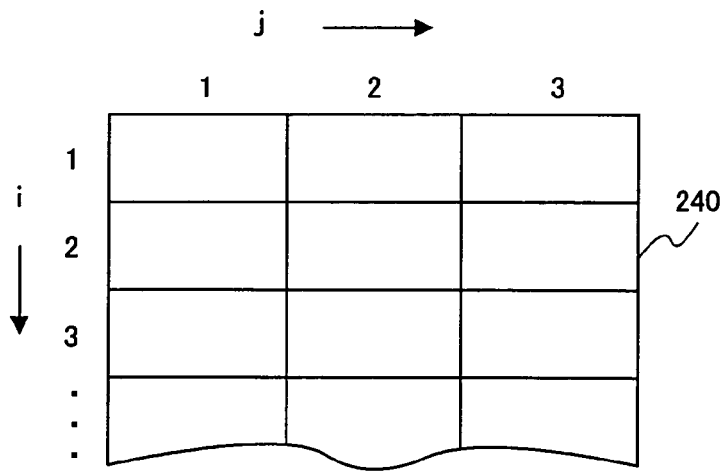
FIG. 4 is a block diagram showing a two-dimensional arrangement including information about correspondence of each image-display device to image data and a displaying order of the image data on a specific image-display device.

The setting unit 122 decides a displaying order of the screen data and correspondence of the screen data to the image-display devices 102 by following instructions inputted to the instruction-input unit 124 by a user through a GUI. To be concrete, a two-dimensional arrangement 240 of the screen data is created in the memory unit 116 of the control device 100 in the image-display system as shown in FIG. 4. Each element in the two-dimensional arrangement 240 is set to a file name of each screen data. Each column corresponds to an image-display device 102. Additionally, each row corresponds to an order of the screen data to be displayed by a specific image-display device 102. For instance, an element located in the "i"th row and the "j"th column in the two-dimensional arrangement 240 is a file name of the screen data that is displayed by the "j"th image-display device 102 in the "i"th turn of the displaying order. As described above, the setting unit 122 assigns a file name of each screen data to each element in the two-dimensional arrangement 240.

Figure 5:
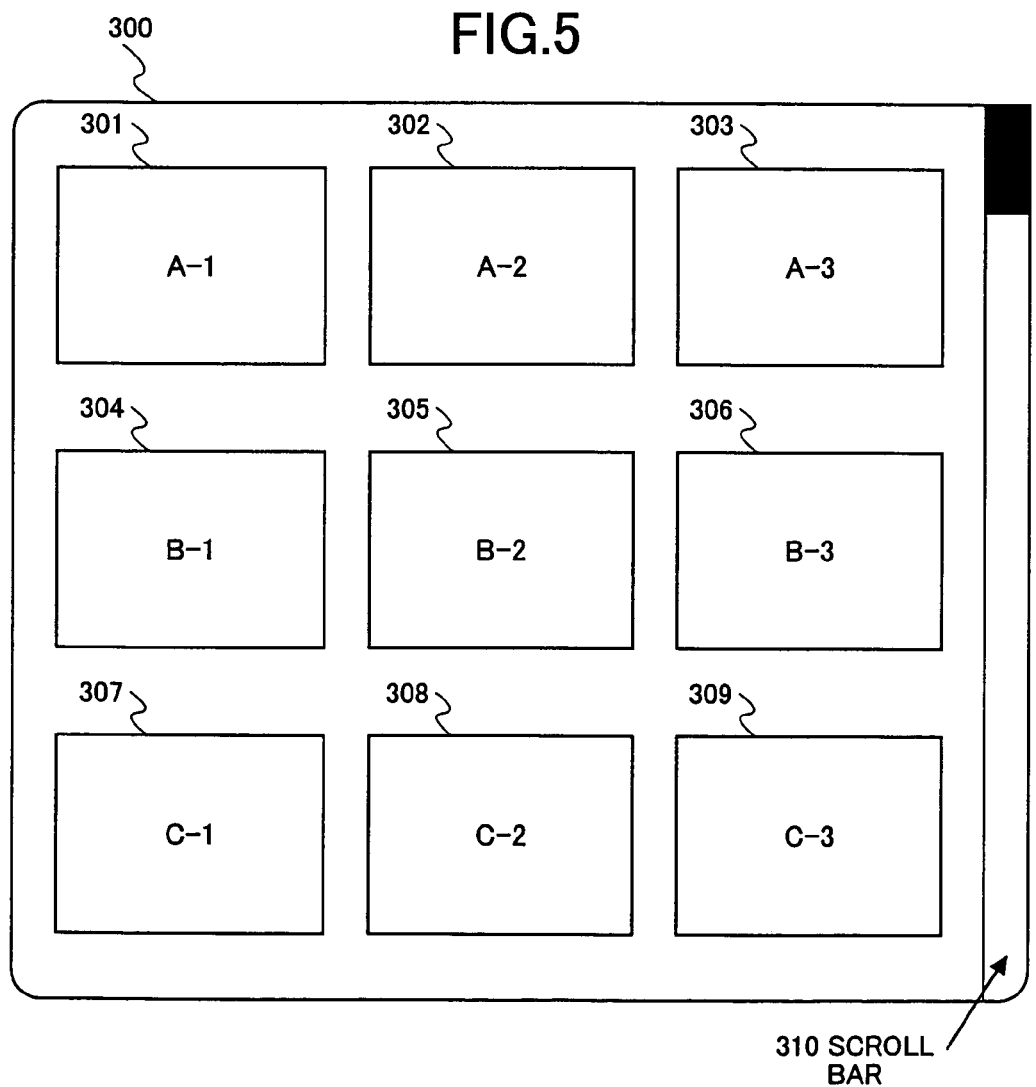
FIG. 5 is a block diagram showing a window used for setting the correspondence of each image-display device to the image data and the displaying order of the image data on the specific image-display device.

Settings of a displaying order of the screen data and correspondence of the screen data to the image-display devices 102 are executed in the computer shown in FIG. 3 as described below. The CRT display 208 of the computer shown in FIG. 3 displays a window 300 shown in FIG. 5, for instance. Additionally, the CRT display 208 displays another window 320 that is not shown in the figures and includes a list of file names of screen data or reduced images of the screen data. The window 300 includes setting frames 301 through 309 and a scroll bar. A file name of screen data A-1 is set as an element located in the first row and the first column of the two-dimensional arrangement 240 stored in the main memory 202 by selecting the screen data A-1 from the window 320 to be initially displayed by the first image-display device 102-1, and then by dragging the screen data A-1 to the setting frame 301 by a mouse, for example. A reduced image of the screen data A-1 is preferably displayed in the setting frame 301 when the screen data A-1 is dragged to the setting frame 301. Similarly, a file name of screen data A-2 is set as an element located in the first row and the second column of the two-dimensional arrangement 240 by selecting the screen data A-2 from the window 320 to be initially displayed by the second image-display device 102-2, and then by dragging the screen data A-2 to the setting frame 302. A file name of screen data A-3 is set as an element located in the first row and the third column of the two-dimensional arrangement 240 by selecting the screen data A-3 from the window 320 to be initially displayed by the third image-display device 102-3, and then by dragging the screen data A-3 to the setting frame 303. Each file name of screen data B-1, B-2 and B-3 is set as an element located in the second row and respectively in the first, second and third columns of the two-dimensional arrangement 240 by respectively dragging the screen data B-1, B-2 and B-3 from the window 320 to the setting frames 304, 305 and 306. Each file name of screen data C-1, C-2 and C-3 is set as an element located in the third row and respectively in the first, second and third columns of the two-dimensional arrangement 240 by respectively dragging the screen data C-1, C-2 and C-3 from the window 320 to the setting frames 307, 308 and 309.

In a case that there is additional screen data to be displayed by the image-display devices 102, a file name of the additional screen data may be dragged to a setting frame after scrolling the scroll bar 310 located at the right edge of the window 300 so that the following setting frames are shown in the window 300. The above-described settings of a displaying order of the screen data and correspondence of the screen data to the image-display devices 102 by use of the GUI can be understood and executed more easily than the settings in without using the GUI. Thus, mistakes during the settings using the GUI occur less frequently than during the settings without using the GUI. Subsequently, the two-dimensional arrangement 240 that has been created as described above is stored as a file in the hard-disk device 218.

Figure 6:
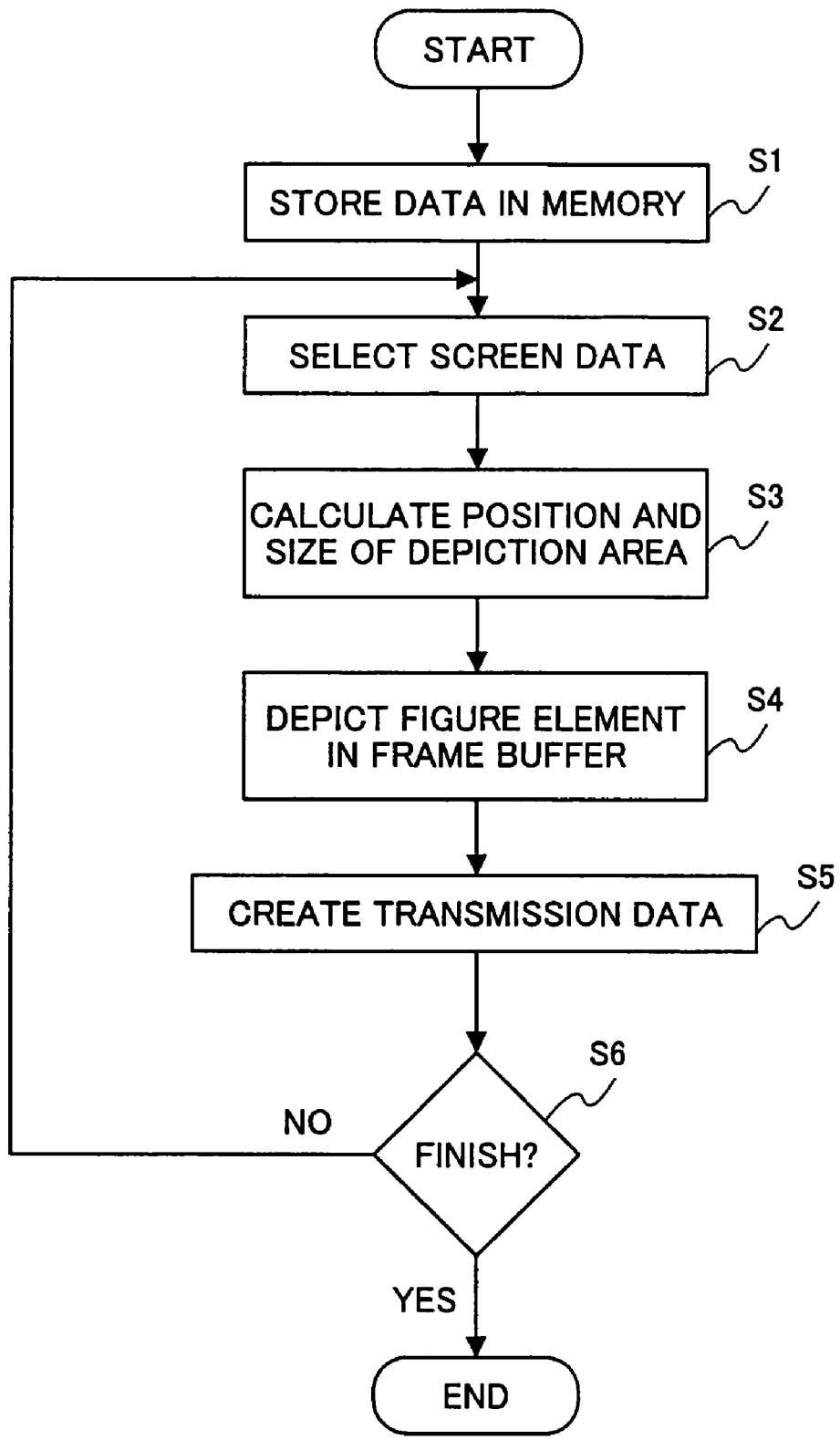
FIG. 6 is a flowchart describing operations performed by the control device provided in the image-display system.

A description will now be given of an operation to display images of the screen data jointly on monitors of the image-display devices 102-1, 102-2 and 102-3. FIG. 6 is a flowchart describing the steps of displaying images jointly on monitors of the three image-display devices 102 performed by a program provided in the control device 100 or the computer shown in FIG. 3. In the image-display system shown in FIG. 2, necessary data such as the two-dimensional arrangement 240 and the screen data is stored in the memory unit 116 at a step S1. For instance, in the computer shown in FIG. 3, the entire two-dimensional arrangement 240 is stored in the main memory 202. The entire screen data or a part of the screen data that is to be displayed early in the displaying order is stored in the main memory 202. In the case that the part of the screen data is stored in the main memory 202, the remaining screen data is read from the hard-disk device 118, and is stored in the main memory 202 when the remaining screen data is necessary.

When the screen data is stored in the main memory 202, a window 400 shown in FIG. 7 is displayed on the CRT display 208. An upper area of the window 400 includes display frames 401, 402 and 403. A lower area of the window 400 includes display frames 404 through 409. Additionally, the window 400 includes a scroll bar 410 at the right edge thereof. Each of the display frames 401, 402 and 403 respectively displays a reduced image of the screen data A-1, A-2 and A-3, each of the screen data A-1, A-2 and A-3 including a file name and respectively being the element of the first, second, and third columns in the first row of the two-dimensional arrangement 240. The display frames 404 through 409 display reduced images of the screen data B-1, B-2, B-3, C-1, C-2 and C-3 in order. Each of the screen data B-1, B-2 and B-3 is respectively the element of the first, second and third columns in the second row of the two-dimensional arrangement 240. Each of the screen data C-1, C-2 and C-3 is respectively the element of the first, second and third columns in the third row of the two-dimensional arrangement 240. The following display frames can be displayed in the lower area of the window 400 by scrolling the lower area of the window 400 by use of the scroll bar 410, wherein the following display frames also display reduced images of the screen data that includes a filename and are elements provided in the fourth row or in a row after the fourth row of the two-dimensional arrangement 240.

At a step S2, the transmission-data-generating unit 118 of the control device 100 selects the screen data A-1, A-2 and A-3, which reduced images are displayed respectively in the display frames 401, 402 and 403. In other words, the transmission-data-generating unit 118 selects the screen data that includes a file number and is set to the first row of the two-dimensional arrangement 240, that is, the first three-screen data in the displaying order, each of the first three-screen data having its corresponding image-display device 102 being set. The selected screen data is then displayed on monitors of the image-display devices 102. A detailed description of a method to display the screen data on the monitors of the image-display devices 102 will be given later.

When a user inputs an instruction by use of the instruction-input unit 124 to switch the screen data A-1, A-2 and A-3 currently being displayed on the monitors of the image-display devices 1021, 102-2 and 102-3 to another row of screen data to be displayed next in the displaying order on a monitor of each of the image-display devices 102, the transmission-data-generating unit 118 selects the elements in the second row of the two-dimensional arrangement 240, that is, the screen data B-1, B-2 and B-3, at the step S2. Subsequently, each of the screen data B-1, B-2 and B-3 is displayed on a monitor of the corresponding image-display devices 102. In such a case, the screen data displayed on the monitors of the image-display devices 102-1, 102-2 and 102-3 is switched simultaneously. The above-described operation to switch the screen data can be executed in the computer shown in FIG. 3, for instance, by pressing a space key of a keyboard, that is, the user-input device 212. When a user has pressed the space key down, screen data in each row shifts up by one, as shown in FIG. 8. Reduced images of the screen data A-1 A-2 and A-3 are eliminated from the display frames 401, 402 and 403. Instead, reduced images of the screen data B-1, B-2 and B-3 that are currently being displayed on the monitors of the image-display devices 102-1, 102-2 and 102-3 are displayed in the display frames 401, 402 and 403.

Each screen data corresponding to the image-display devices 102-1, 102-2 and 102-3 is selected following the displaying order, and the selected screen data is displayed on the monitor of the corresponding image-display device 102 simultaneously. In addition to the above-described method to switch displayed images on the monitors of the three image-display devices 102-1, 102-2 and 102-3, there is a method to display desired screen data on a monitor of any image-display device 102. The method takes steps of selecting desired screen data without considering correspondence of screen data to the image-display devices and a displaying order of the screen data by inputting an instruction to the transmission-data-generating unit 118 from the instruction-input unit 124, and displaying the desired screen data on the monitor of a desired image-display device 102. In the computer shown in FIG. 3, the above-described method can be executed by dragging a reduced image of screen data displayed in any display frame provided in the lower area of the window 400 to any display frame provided in the upper area of the window 400. For example, if a reduced image of screen data D-3 displayed in the display frame 409 is dragged to the display frame 403, the screen data D-3 is selected, and is displayed on the monitor of the image-display device 102-3. Meanwhile, images displayed on the monitors of the image-display devices 102-1 and 102-2 remain displayed. The above-described method switches images displayed on the image-display devices 102-1, 102-2 and 102-3 by use of the GUI, so that desired screen data and a desired display frame whereto the desired screen data is dragged can be easily specified. Thus, errors during specification of the screen data and the display frame hardly occur.

At a step S3 shown in FIG. 6, a position and a size of a depiction area (rectangular area) for each figure element including texts and lines of screen data (HTML data) selected at the step S2, are calculated. Subsequently, at a step S4, each figure element is depicted. For instance, in the computer shown in FIG. 3, the frame buffers 231, 232 and 233 are provided in the main memory 202 for each of the image-display devices 102-1, 102-2 and 102-3, and are used for depicting each figure element. At a step S5, transmission data is created by use of depicted data and the calculated position and size of the depiction area. The steps S2 through S5 are repeated until a user inputs an instruction to end the steps to the instruction-input unit 124. When the instruction to end the steps is inputted to the instruction-input unit 124 at a step S6, a sequence of the steps S2 through S6 is terminated.

Figures 9, 10:
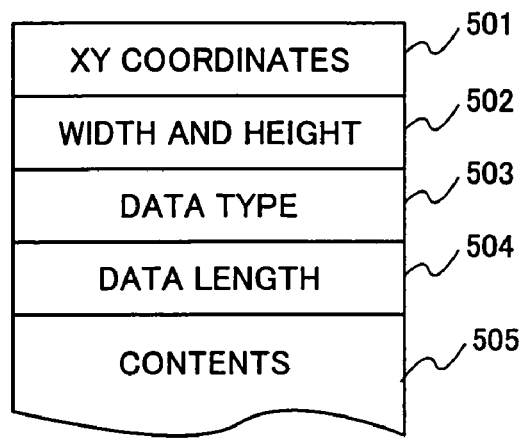
FIG. 9 is a block diagram showing a structure of area-updating data.
FIG. 10 is a diagram showing an embodiment of the screen data.
Figure 11:
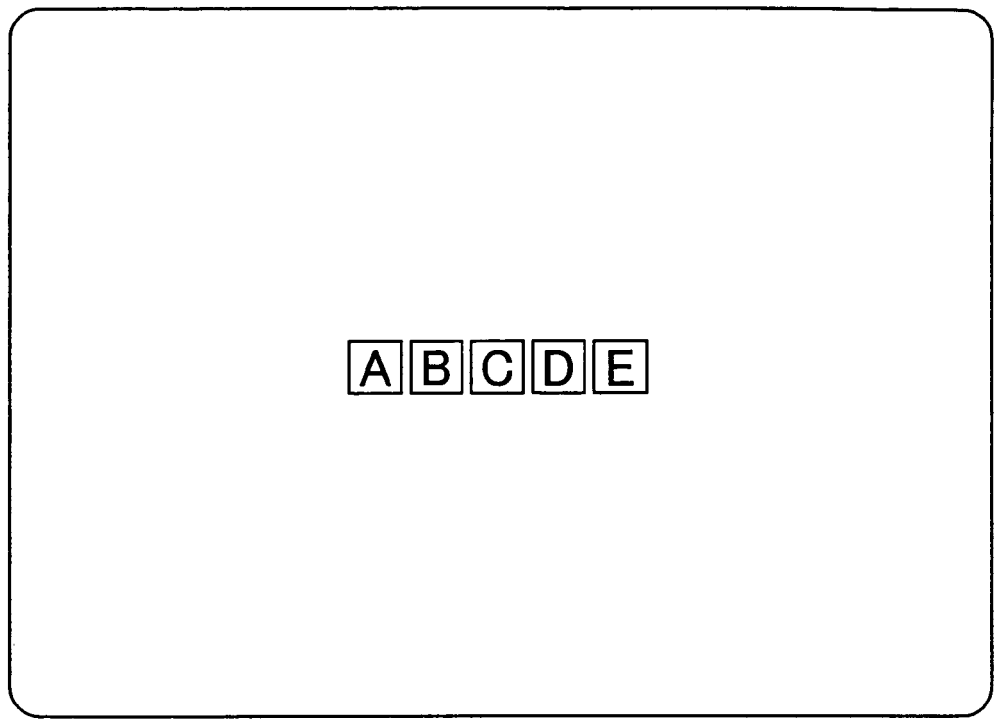
FIG. 11 is a diagram showing a depiction area of five characters in the screen data shown in FIG. 10.

Transmission data created by the transmission-data-generating unit 118 is area-updating data that takes a structure as shown in FIG. 9, and includes data 501 and 502 that specify a rectangular area which contents should be updated, and data 503, 504 and 505 that specify contents for updating existing contents. The data 501 indicates upper left coordinates (X, Y) of the rectangular area which contents should be updated. The data 502 indicates the width and the height of the rectangular area. Additionally, the data 503, 504 and 505 respectively indicates a data type, a data length and contents of data having a variable data length used for updating the existing contents of the rectangular area. The data type 503 specifies whether the data type of the contents is raster data or solid data. If the data type is specified as a raster-data type, the contents 505 are raster data with each pixel being 3 bytes long. Accordingly, the data length 504 indicates the total number of bytes in the raster data, the total number of bytes being calculated by multiplying the width of the rectangular area, the height of the rectangular area and 3 bytes. If the data type is specified as a solid-data type, the contents 505 are data that is 3 bytes long specifying a color to paint the entire rectangular area. In such case, the data length 504 is set to 3 bytes. For example, screen data which contents are shown in FIG. 10 includes solid data a for clearing the entire screen and raster data for updating depiction areas that are shown in FIG. 11 as rectangles containing five characters A, B, C, D and E. Accordingly, the transmission-data-generating unit 118 creates the solid data and the raster data as transmission data to transmit each of the transmission data in order.

In the above-described image-display system, the control device 100 and the image-display devices 102 are connected by the USB interface 110, that is, a bus interface. Transmission data transmitted from the transmission unit 120 of the control device 100 to all of the image-display devices 102-1, 102-2 and 102-3 flows through a single bus cable. As the number of the image-display devices 102 increases, quantity of data transmitted through the bus increases, and thus the time taken for updating screen data displayed on a monitor of an image-display device 102 becomes longer. For example, it takes about 1.6 seconds to transmit raster data which size is equal to a screen size 1024×768 pixels multiplied by a pixel size of 24 bits through the USB bus, which maximum data transmission speed is 12 Mbps. If the number of the image-display devices 102 is three, transmission time to transmit data to three of the image-display devices 102 is about 4.8 seconds, and thus quick update of the screen data cannot be executed. However, the image-display system according to the present invention transmits screen data expressed by using both a raster-data format (raster-data type) and a solid-data format (solid-data type) to the image-display devices 102 instead of transmitting the screen data expressed by using only the raster-data format. A size of the screen data that is expressed by using both the raster-data format and the solid-data format is smaller than a size of the screen data expressed by using only the raster-data format. Accordingly, a quantity of data transmitted by the control device 100 through the USB bus to the image-display devices 102 is reduced in the image-display system according to the present invention. Thus, screen data displayed on each of the image-display devices 102 can be updated quickly and almost simultaneously even if the number of the image-display devices 102 increases.

A method to reduce the quantity of screen data expressed by using only the raster-data format (raster data) by compressing the raster data before transmitting the screen data is effective for shortening the transmission time in addition to the above-described method. However, the size of the screen data expressed by using only the raster-data format is hardly compressed to the size of the same screen data expressed by using both the raster-data format and the solid-data format. In such a case, each image-display device 102 needs to include a method to expand compressed screen data so that a structure of each image-display device 102 becomes complicated. In addition, the processing time required to compress and to expand the screen data causes a delay in updating the screen data displayed on a monitor of an image-display device 102.

Figure 12:
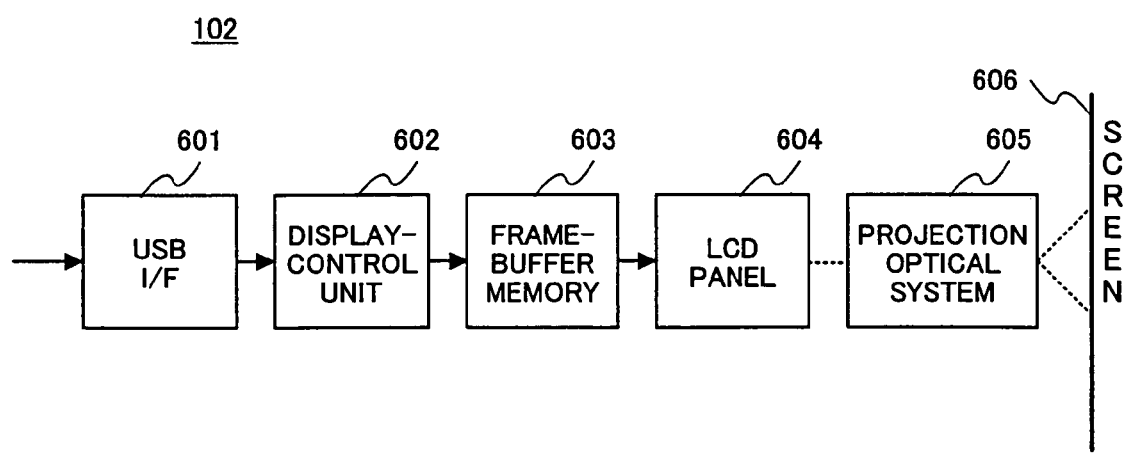
FIG. 12 is a block diagram showing a structure of the image-display device according to a third embodiment of the present invention.

FIG. 12 is a block diagram showing a structure of the image-display device 102 according to a third embodiment of the present invention. The image-display device 102 is a projector-type image display device including a USB interface unit 601, a display-control unit 602, a frame-buffer memory 603, an LCD (Liquid-Crystal Display) panel 604 and a projection optical system 605. The image-display device 102 may be another projector-type image display device or one of various types of image-display devices that are not a projector-type image display device. Area-updating data that is screen data expressed by using both the raster-data format and the solid-data format is transmitted from the control device 100 to the USB interface 601 of the image-display device 102. The display-control unit 602 interprets the area-updating data received at the USB interface 601 and rewrites data stored in the frame-buffer memory 603. If the area-updating data is solid data, specified color data is copied to a specified area of the frame-buffer memory 603. If the area-updating data is raster data, the raster data is copied to a specified area of the frame-buffer memory 603. Since the image-display device 102 uses the area-updating data that takes the above-described formats, processes performed by the display-control unit 602 become simple. The data rewritten and stored in the frame-buffer memory 603 is then displayed on the LCD panel 604. Subsequently, the data displayed on the LCD panel 604 is then projected on a screen 606 by the projection optical system 605.

Figure 13:
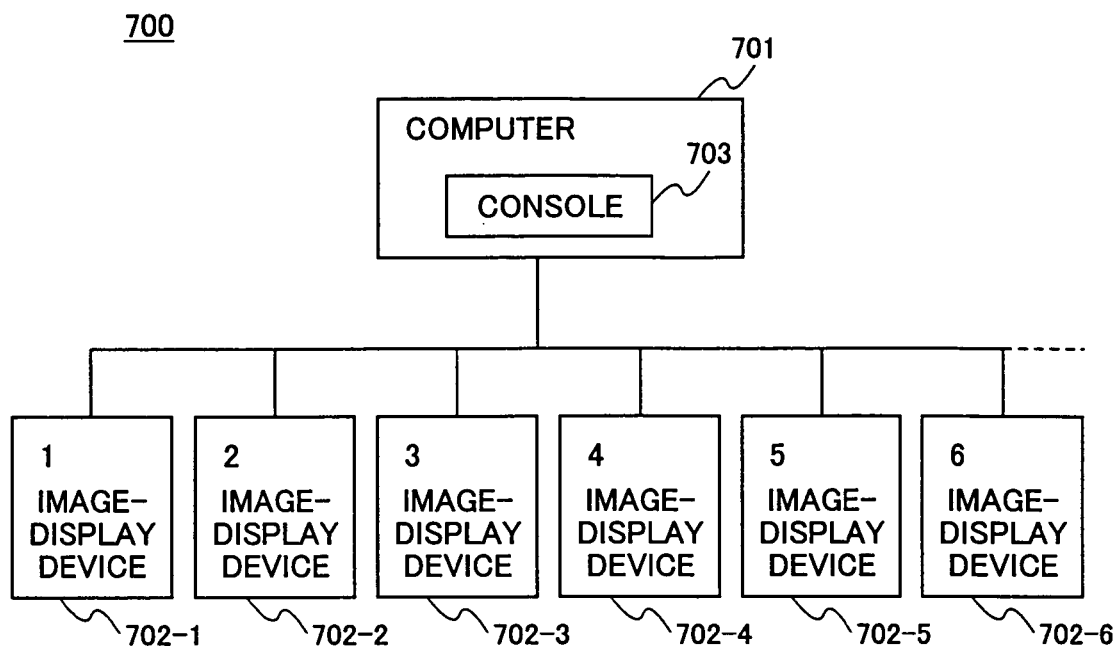
FIG. 13 is a block diagram showing a hardware environment of the image-display system according to a fourth embodiment of the present invention.

A description will now be given of an image-display system according to a fifth embodiment of the present invention. FIG. 13 is a block diagram showing a hardware environment of an image-display system 700 according to a fourth embodiment of the present invention. The image-display system 700 shown in FIG. 13 includes a computer 701 and image-display devices 702-1 through 702-6. The computer 701 and the image-display devices 702-1 through 702-6 are connected to each other by a bus cable, for instance. The computer 701 additionally includes software operated therein. The software is included in the computer 701, for example, by copying a program read from a record medium that is readable by the computer 701 and storing the program according to an embodiment of the present invention in the computer 701. The image-display system 700 can include a user interface as a hardware module instead of a software module. The computer 701 includes a primary image-display device such as a CRT display and an LCD panel. It should be noted that the primary image-display device is referred to as a console 703 hereinafter. CRT displays, LCD panels and projectors that can display image data given by the computer 701 may be used as the image-display devices 702-1 through 702-6. Additionally, each of the image-display devices 702-1 through 702-6 is identified automatically by the computer 701, and receives an identification number (ID) when it is connected to the computer 701. For example, each of the image-display devices 702-1 through 702-6 is assigned with numbers 1 through 6 respectively.

Figure 14:
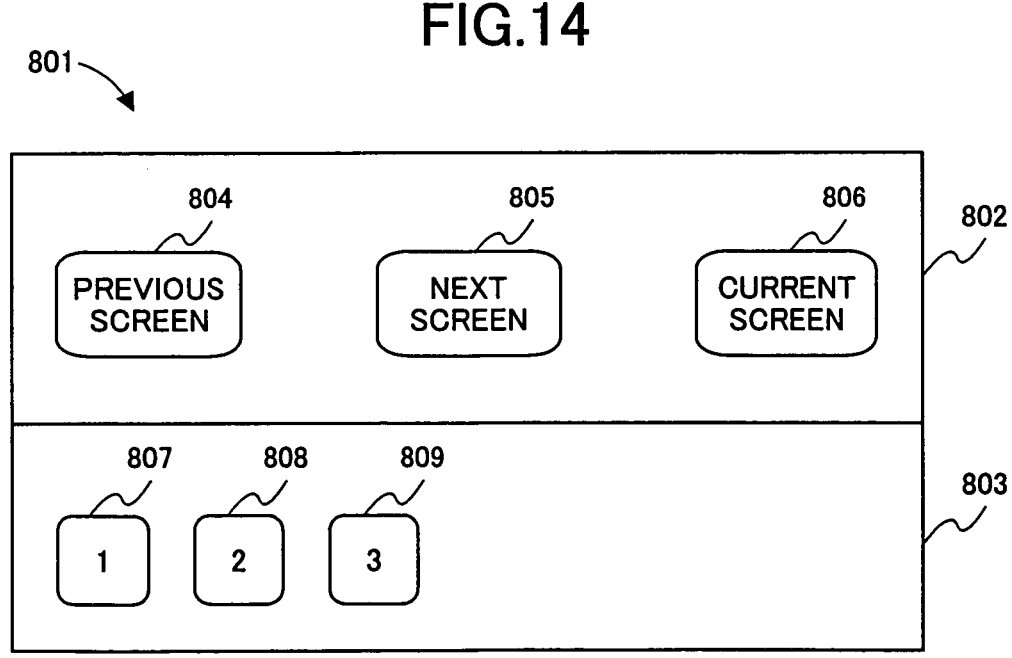
FIG. 14 is a block diagram showing a user interface according to a sixth embodiment of the present invention.

FIG. 14 is a block diagram showing a user interface according to a sixth embodiment of the present invention. The user interface includes a GUI (Graphical User Interface), for example. The user interface shown in FIG. 14 is an operation screen 801 displayed on the console 703 when setting relations between the image-display devices 702-1 through 702-6. The operation screen 801 includes an upper area 802 and a lower area 803. The lower area 803 includes icons 807, 808 and 809 indicating the image-display devices 1, 2 and 3 that are currently connected to the computer 701. The embodiment of the icons displayed in the lower area 803 is not limited to that described above. Identification numbers 1, 2 and 3 are displayed respectively on the image-display devices 702-1, 702-2 and 702-3 so that a user can recognize correspondence of an identification number displayed on each of the image-display devices 702-1, 702-2 and 702-3 to an identification number displayed on each of the icons 807, 808 and 809.

The upper area 802 includes a frame 804 indicating "previous screen", a frame 805 indicating "next screen" and a frame 806 indicating "current screen". Image-display devices displaying the next screen and the previous screen are determined by dragging the icons 807, 808 and 809 to the frames 804, 805 and 806. For instance, the image-display devices 1 and 2 are set for displaying respectively the next screen and the previous screen by dropping the icon 807 to the frame 805 "next screen" and the icon 808 to the frame 804 "previous screen". An image-display device set for displaying the previous screen displays a page displayed when a "back" button of a web browser is pressed down. Similarly, a page next to a current page is displayed on an image-display device set for displaying the next screen. Both the present invention and the invention disclosed in Japanese Laid-Open Patent Application No. 9-81475 include a technology to set the relation between the image-display devices in advance. Additionally, the invention disclosed in Japanese Laid-Open Patent Application No. 9-81475 discloses a technology to transmit a file including a sequence of pages to the image-display devices. However, in the present invention, the previous screen and the next screen can be set to the image-display devices dynamically by a user's control.

Figure 15:
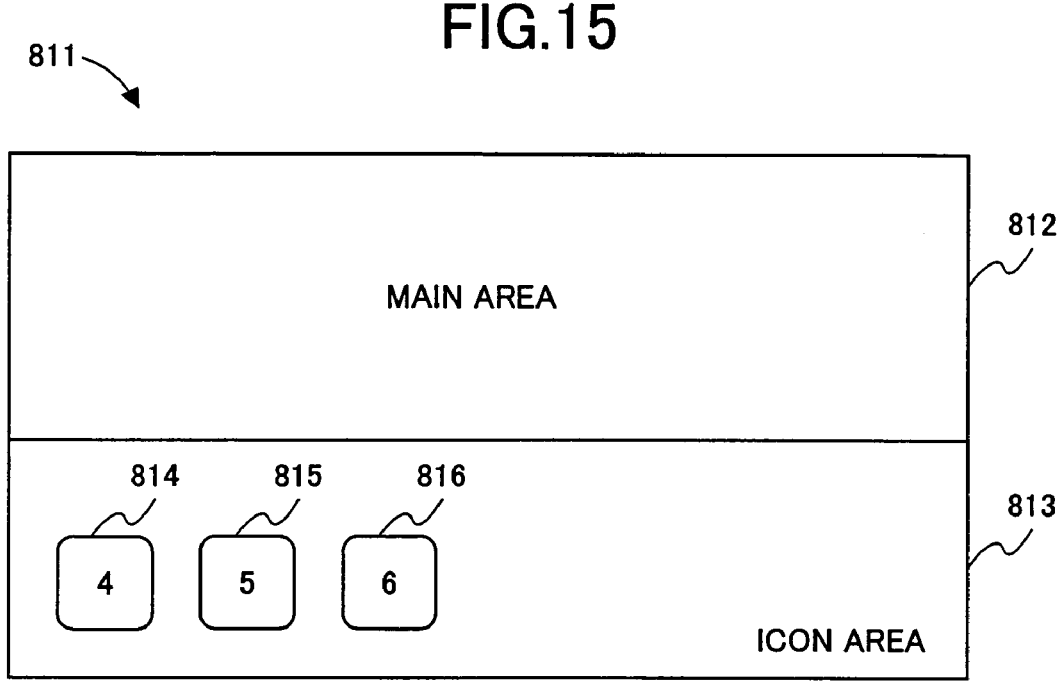
FIG. 15 is a block diagram showing a console screen provided in the user interface of the image-display system according to a seventh embodiment of the present invention.

A description will now be given of an operation of an image-display device with reference to FIG. 15. FIG. 15 shows a console screen provided in the user interface of the image-display system 700 according to a seventh embodiment of the present invention. A console screen 811 provided in the console 703 includes a main area 812 and an icon area 813. The main area 812 has a function similar to a regular web browser. For instance, the main area 812 obtains specified hypertext data, analyzes the data, and displays the data as an image. The icon area 813 includes icons 814, 815 and 816 indicating image-display devices connected to the computer 701. In this embodiment, the icons 814, 815 and 816 indicate that the image-display devices 702-4, 702-5, and 702-6 are connected to the computer 701. However, the present invention is not limited to the above-described case. Icons corresponding to the image-display devices 702-1, 702-2, and 702-3 that are set for displaying the previous, current and next screens in the sixth embodiment are not shown in the console screen 811. By dragging a link displayed in the main area 812 and dropping the link to one of the icons 814, 815 and 816, data linked from a current page is displayed on an image-display device corresponding to the icon to which the link is dropped. Additionally, the current page is displayed on a specified image-display device by dragging an area excluding links on the current page and dropping the area to an icon corresponding to the specified image-display device.

Figure 16:
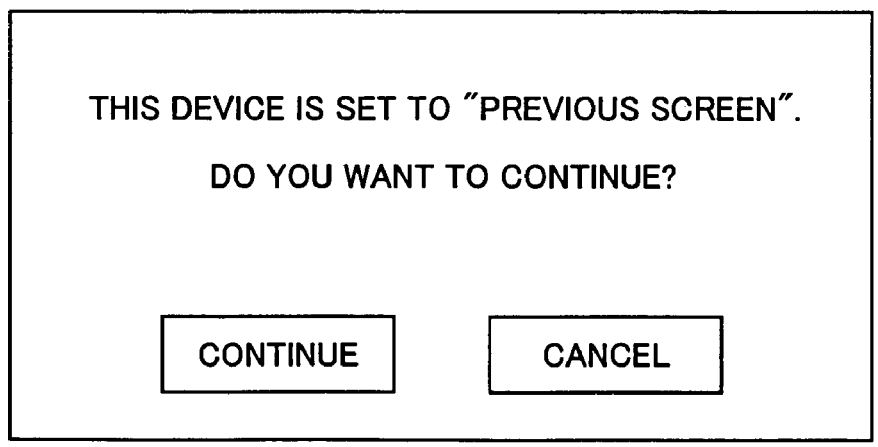
FIG. 16 is a diagram showing a dialog asking a user to select one of a continuation and a cancellation of relations among a plurality of the image-display devices in the user interface of the image-display system according to an eighth embodiment of the present invention.

FIG. 16 is a diagram showing a dialog asking a user to select one of a continuation and a cancellation of the relations among a plurality of the image-display devices in a user interface of the image-display system 700 according to an eighth embodiment of the present invention. Icons corresponding to the image-display devices 702-1, 702-2 and 702-3 that are set for displaying the previous, current and next screens may be displayed in the icon area 813 shown in FIG. 15 in addition to the icons 814, 815 and 816. In such case, a user is asked to select one of a continuation and a cancellation of the relation between a specified image-display device and its corresponding screen by displaying a dialog shown in FIG. 16 when each of the image-display devices 702-1, 702-2 and 702-3 are specified. Data included in the screen corresponding to the specified image-display device is displayed on the specified image-display device whether the user has selected the continuation or the cancellation of the relation between the specified image-display device and its corresponding screen. However, in a case that the continuation has been selected, each screen is rewritten with new data according to the relation that has been set when the current screen is changed to another screen following a link provided on the current screen. In a case that the cancellation has been selected, data on a screen dropped to one of the icons 814, 815 and 816 provided in the icon area 813 is kept on the screen when the current screen is to be changed following a link provided on the current screen.

Figure 17:
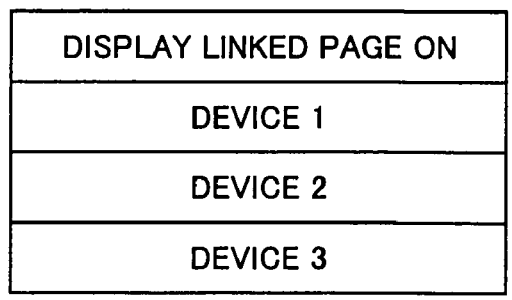
FIG. 17 is a diagram showing a pop-up menu used for specifying a desired image-display device to display a page linked to the current page thereon in the user interface of the image-display system according to a ninth embodiment of the present invention.

FIG. 17 is a diagram showing a pop-up menu used for specifying a desired image-display device to display a page linked to the current page thereon in a user interface of the image-display system 700 according to a ninth embodiment of the present invention. The seventh embodiment shown in FIG. 15 displays the icon area 813, whereas the ninth embodiment uses a pop-up menu for selecting an image-display device. In this embodiment, the pop-up menu shown in FIG. 17 is displayed near a mouse cursor by pressing the second button of a mouse. The number of items provided in the pop-up menu is equal to the number of the image-display devices connected to the computer 701. For instance, if a user clicks an item "display on image-display device 3" by use of the mouse, image data included in the current page or in a page linked to the current page is read therefrom, and then is displayed on the image-display device 702-3.

In the image-display system 700 according to the present invention, not only the current page but also the previous and next pages linked to the current page in a link series are displayed by use of the image-display devices. If the current page is at an end of the link series so that the previous or next page does not exist, an image-display device corresponding to the previous or next page displays no image data. A page containing HTML data may not fit on a monitor of an image-display device. Therefore, when displaying image data by use of an image-display device such as the LCD panel that is a hand-held device and other image-display devices that cannot display one page of the HTML data on its monitor, the entire page of HTML data can be displayed on the monitor by providing a scroll button, and then by scrolling the page in the image-display device.

Figure 18:
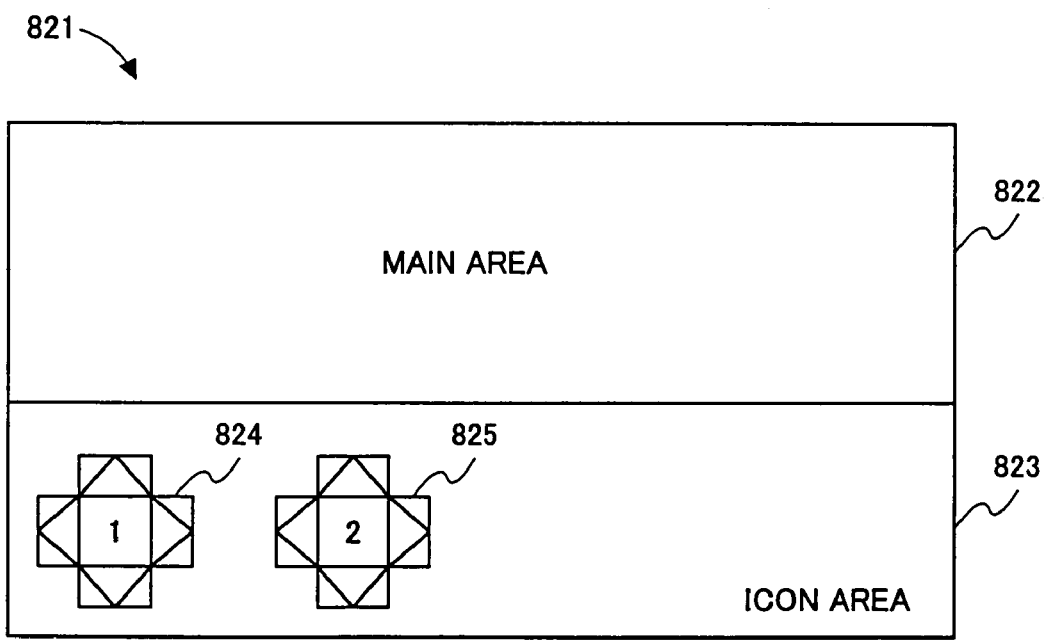
FIG. 18 is a block diagram showing a scroll button provided on the console screen displayed on a console of the image-display system according to a tenth embodiment of the present invention.

FIG. 18 is a block diagram showing a scroll button provided on a console screen displayed on the console 703 of the image-display system 700 according to a tenth embodiment of the present invention. A console screen 821 includes a main area 822 and an icon area 823. The icon area 823 includes scroll buttons 824 and 825 for each image-display device. The scroll buttons 824 and 825 are operated by a mouse so that image data displayed on an image-display device can be scrolled even in an image-display device such as a projector that a user can hardly touch directly while the projector is being operated. FIG. 18 shows the scroll buttons 824 and 825 that respectively correspond to the image-display devices with their identification numbers set to 1 and 2. However, an embodiment of the present invention is not limited to the above-described case.

Figure 19:
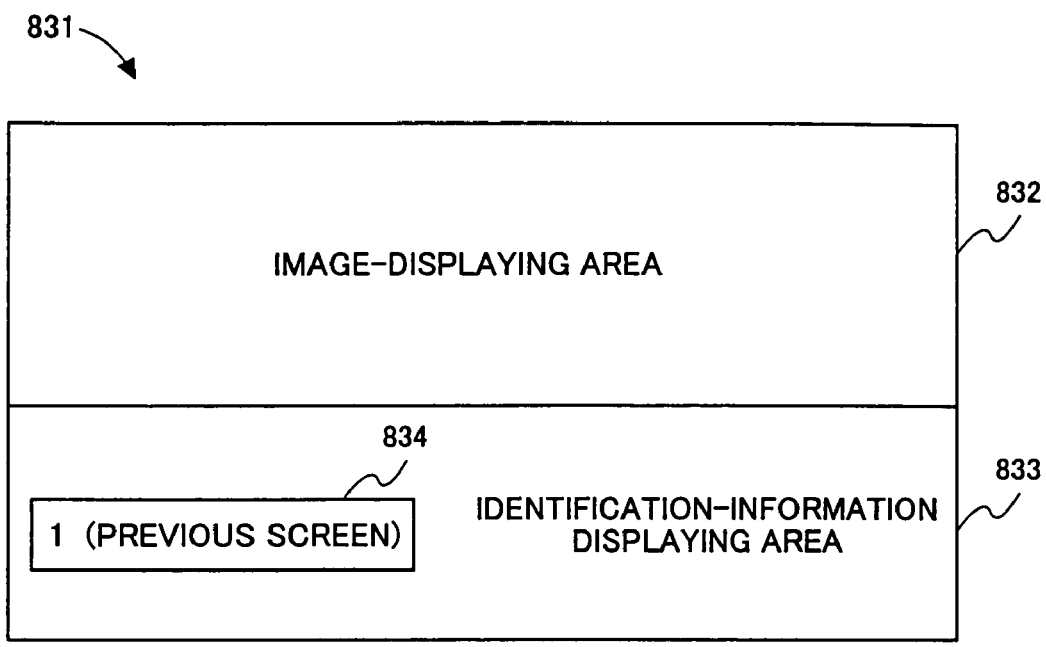
FIG. 19 is a block diagram showing identification information of the image-display device on the console screen displayed on the console of the image-display system according to an eleventh embodiment of the present invention.

FIG. 19 is a block diagram showing identification information of an image-display device on a console screen displayed on the console 703 of the image-display system 700 according to an eleventh embodiment of the present invention. It is possible to display identification information on each image-display device such as the LCD panel that can easily be carried in order to identify each image-display device easily. In the eleventh embodiment, a console screen 831 shown in FIG. 19 includes an image-displaying area 832 and an identification-information displaying area 833. The image-displaying area 832 displays hypertext data received from the computer 701. The identification-information area 833 displays identification information 834 about an image-display device and correspondence of the image-display device to a page if the identification information and the correspondence have been set. FIG. 19 shows a case in which the identification information of the image-display device is "1", and the image-display device corresponds to the previous page.

Figure 20:
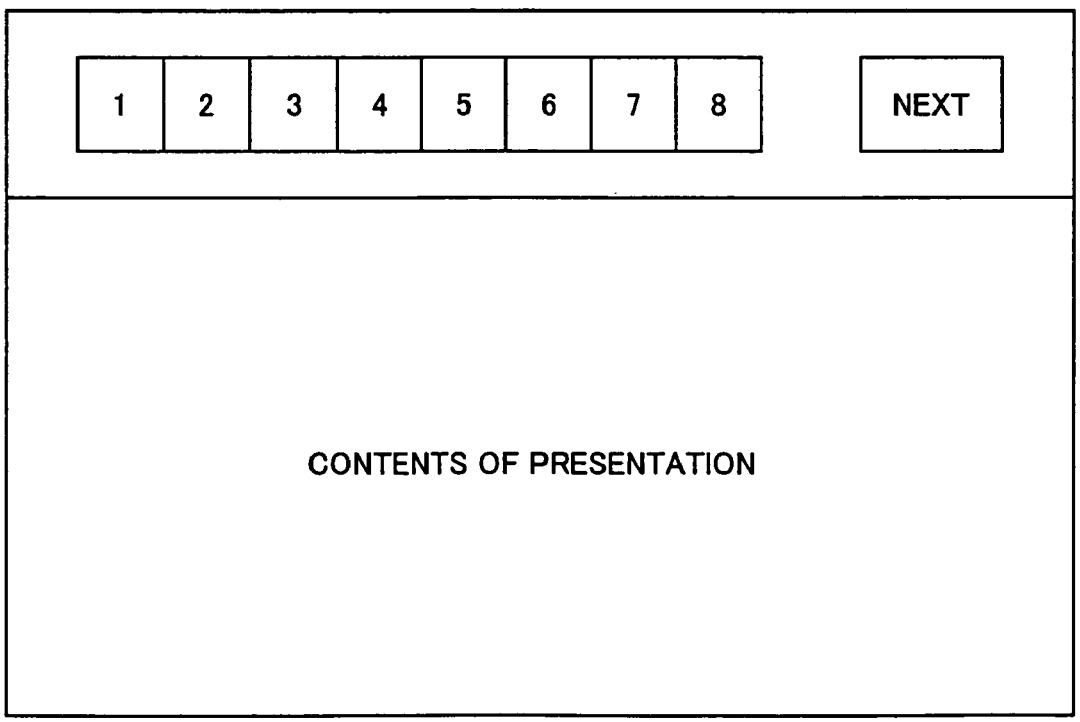
FIG. 20 is a block diagram showing an application using the image-display system according to a twelfth embodiment of the present invention.

FIG. 20 is a block diagram showing an application using the image-display system according to a twelfth embodiment of the present invention. FIG. 20 shows an embodiment to display data used for a presentation using a projector. Two projectors are connected to the computer 700, the two projectors being set respectively to the current page and the previous page. A link "next" is provided to each page so that each page is connected by the link "next" to the following page in one dimension. In addition, each page is provided with a link to all the pages. A button indicating a link to a page currently displayed by an image-display device is preferably deactivated for a user not to click the button. During a regular presentation, a displayed image is switched to the next image by following the link "next". Consequently, the current page and the previous page are constantly displayed on the two projectors so that the context of the presentation becomes more understandable. Additionally, any two pages can be displayed on the projectors simultaneously by dragging and dropping a link to a specific page to the projectors. The link can be dropped to a projector that has been set for displaying the previous page in addition to a projector that has been set for displaying the current page.

A description will now be given of a method to display desired pages simultaneously according to a thirteenth embodiment of the present invention. A method of collecting desired pages among a plurality of pages that are connected to each other complicatedly and reading the desired pages simultaneously by use of LCD panels takes the following steps. The first page A is initially located by following hyperlinks, and is displayed on a console screen provided on the console 703 of the computer 701. Subsequently, the first page A is displayed on the image-display device 1. The second page B is located by following the hyperlinks again, and is displayed on the console screen. When the second page B is displayed on the console screen, the first page A is still being displayed on the image-display device 1. Thus, a user can read both the first page A and the second page B simultaneously. Similarly, the user can read as many pages as the number of the image-display devices by taking the above-described steps.

As described above, the present invention provides an image-display system that can collectively control each of a plurality of image-display devices to display images following predetermined settings. Furthermore, the cost of producing the image-display system is low, since a general personal computer including a bus interface such as a USB interface can be used as a control device provided in the image-display system without adding any special hardware. Additionally, a user can set correspondence of screen data to an image-display device and a displaying order of the screen data on the image-display device at any time. Even if the predetermined settings are stored in the control device, the image-display system can display any screen data selected by a user on any image-display whenever the user inputs an instruction to do so. An operation by the user to select desired screen data to be displayed on a desired image-display device can be executed easily and firmly by use of a GUI. Even if a data-transmitting speed of an interface connecting the control device and image-display devices is slow, the image-display system can update the screen data displayed on the image-display devices quickly since the control device transmits the screen data as area-updating data to the image-display devices for updating the screen data displayed on the image-display devices. Additionally, each of the control device and the image-display devices does not need to include a function to compress and expand the screen data, and thus structures of the control device and the image-display devices can be simplified. Moreover, the image-display system can avoid delay in update of the screen data displayed on the image-display devices according to time taken to compress and expand the screen data. Additionally, the image-display system can collectively control each of the image-display devices to display the screen data in a predetermined displaying order.

By use of the user interface according to the present invention, a user can relate a specific page or link in a document written in a hypertext having complicated relations of connecting to other hypertexts to a specific image-display device so that the specific page or link can be displayed on the specific image-display device. Additionally, the user interface can easily direct the image-display devices to display screen data desired by the user. Additionally, in a case that the present invention is adapted to a presentation and the like, the current page and the previous page can be always displayed on screens, and thus relation between parts in a presentation becomes clear.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 11-330522, filed on Nov. 19, 1999, and Japanese Priority Application No. 2000-237462, filed on Aug. 4, 2000, the entire contents of which are hereby incorporated by reference.

What is claimed is:

1. An image-transmitting device connected to a plurality of image display devices through a bus cable, said image-transmitting device comprising:
   a memory unit storing a set of screen data, each individual of said set of screen data corresponding to one of said plurality of image-display devices, said memory unit further storing a displaying order of said individual of said set of screen data to be displayed on said corresponding image-display devices;
   a transmission-data-generating unit selecting specific screen data from among the set of the screen data by following the correspondence between each individual of said set of screen data and respective of said image display devices and the displaying order, and generating transmission data that each of said image-display devices is to display based on the selected specific screen data;
   a bus interface connected to said image-display devices through the bus cable;
   a transmission unit transmitting the transmission data from said bus interface through the bus cable to each of said image-display devices; and
   an instruction-input unit that is used by a user to select one of the screen data and one of said image-display devices through a graphical user interface (GUI), and to direct the selected image-display device to display the selected screen data, wherein the transmission data is generated based on the selected screen data by said transmission-data-generating unit, and then is transmitted to the selected image-display device by said transmission unit,
   wherein said transmission data includes data of a first data type for an entire screen and area updating data of a second data type different from the first data type for updating part of the entire screen, the area updating data including data specifying an updating area of the screen data displayed on an image-display device and data used for updating part of the screen data displayed in the updating area.

2. The image-transmitting device as claimed in claim 1, wherein said memory unit further includes a two-dimensional arrangement in which file names of the screen data are placed in a position corresponding to an image-display device that is to display said screen data and the displaying order of said screen data.

3. The image-transmitting device as claimed in claim 1 further comprising a setting unit by which a user sets the correspondence of the screen data to each of said image-display devices and the displaying order of the screen data in advance.

4. The image-display system as claimed in claim 1 further comprising:
   a setting unit setting the correspondence of the screen data to each of said image-display devices and the displaying order of the screen data in advance by following the instruction inputted by the user through said instruction-input unit.

5. The image-transmitting device as claimed in claim 1, wherein said image-transmitting device is a computer including a USB (Universal Serial Bus) interface as said bus interface, and said bus cable is a USB cable.

6. An image-display system including a control device and a plurality of image-display devices connected through a bus interface to said control device,
   said control device comprising:
   a memory unit storing a set of screen data, each individual of said set of screen data corresponding to one of said plurality of image-display devices, said memory unit further storing a displaying order of said individual of said set of screen data to be displayed on said corresponding image-display devices;
   a transmission-data-generating unit selecting specific screen data from among the set of the screen data by following the correspondence between each individual of said set of screen data and respective of said image display devices and the displaying order, and generating transmission data that each of said image-display devices is to display based on the selected specific screen data;
   a transmission unit transmitting the transmission data through said bus interface to each of said image-display devices; and
   an instruction-input unit that is used by a user to select one of the screen data and one of said image-display devices through a graphical user interface (GUI), and to direct the selected image-display device to display the selected screen data, wherein the transmission data is generated based on the selected screen data by said transmission-data-generating unit, and then is transmitted to the selected image-display device by said transmission unit,
   wherein said transmission data includes data of a first data type for an entire screen and area updating data of a second data type different from the first data type for updating part of the entire screen, the area updating data including data specifying an updating area of the screen data displayed on an image-display device and data used for updating part of the screen data displayed in the updating area.

7. An image-display system comprising:
   a computer including a primary image-display device that displays a document including a plurality of pages;
   a plurality of image-display devices that are connected to said computer, and that are configured to display the document; and
   a user interface configured to allow a user to relate a specific page in the document to a specific image-display device among said plurality of image-display devices in a one-to-one correspondence between said specific page and a respective specific of the plurality of image-display devices, said user interface including:
   an instruction-input unit that is used by a user to select one of the screen data and one of said image-display devices through a graphical user interface (GUI), and to direct the selected image-display device to display the selected screen data, wherein the transmission data is generated based on the selected screen data by said transmission-data-generating unit, and then is transmitted to the selected image-display device by said transmission unit,
   wherein said user interface displays icons indicating said image-display devices on said primary image-display device, and allocates the specific page to an icon to display the specific page on an image-display device corresponding to the icon.

8. The image-display system as claimed in claim 7, wherein said image-display system displays identification information of said image-display device and information about correspondence of said image display device to the specific page when displaying the specific page on said image-display device.

9. The image-display system as claimed in claim 7, wherein said user interface allocates the specific page to the icon by dragging and dropping said specific page to said icon.

10. The image-display system as claimed in claim 7, wherein said user interface displays a pop-up menu on one of the specific page and an area indicating the specific page on the primary image-display device, said pop-up menu being used for selecting the image display device to display the specific page thereon.

11. The image-display system as claimed in claim 7, wherein said image-display system allocates each of previously displayed screen data and screen data to be displayed next to currently displayed screen data on said primary image-display device to any of said image-display devices.

12. The image-display system as claimed in claim 7, wherein said image-display system displays a scroll button on a screen of said primary image-display device, said scroll button being used for scrolling the screen of the image-display device displaying said specific page.

13. The image-display system as claimed in claim 7, wherein said document is a hypertext document, and each page of said document includes links to other pages.

14. A method of controlling screen data displayed on a plurality of image-display devices connected to a control device through a bus interface, said method comprising the steps of:
storing a set of the screen data, each individual of said set of screen data corresponding to one of said plurality of image-display devices, and further storing a displaying order of said individual of said set of screen data to be displayed on said corresponding image-display devices, in said control device;
selecting the screen data corresponding to each of said image-display devices from among the set of the screen data by following the correspondence between each individual of said set of screen data and respective of said image display devices and the displaying order;
updating the screen data displayed on each of said image-display devices simultaneously based on the selected screen data through the bus interface; and
selecting, by a user, one of the screen data and one of said image-display devices through a graphical user interface (GUI), and directing the selected image-display device to display the selected screen data, wherein the transmission data is generated based on the selected screen data by said selecting step, and then is transmitted to the selected image-display device,
wherein the step of updating the screen data displayed on each of said image-display devices simultaneously comprises a step of transmitting data including data of a first data type for an entire screen and area updating data of a second data type different from the first data type for updating part of the entire screen, the area-updating data including data specifying an updating area of the screen data displayed on an image-display device and data used for updating part of the screen data displayed in the updating area.

15. A method of controlling screen data displayed on a plurality of image-display devices connected to a control device through a bus interface, said method comprising the steps of:
storing a set of the screen data, each individual of said set of screen data corresponding to one of said plurality of image-display devices, and further storing a displaying order of said individual of said set of screen data to be displayed on said corresponding image-display devices, in said control device;
selecting the screen data corresponding to each of said image-display devices from among the set of the screen data by following the correspondence between each individual of said set of screen data and respective of said plurality of image display devices and the displaying order;
generating transmission data that each of said image-display devices is to display based on the selected screen data;
transmitting the transmission data to each of said image-display devices through said bus interface; and
selecting, by a user, one of the screen data and one of said image-display devices through a graphical user interface (GUI), and directing the selected image-display device to display the selected screen data, wherein the transmission data is generated based on the selected screen data by said selecting step, and then is transmitted to the selected image-display device; and
updating the screen data displayed on each of said image-display devices simultaneously by transmitting data including data of a first data type for an entire screen and area updating data of a second data type different from the first data type for updating part of the entire screen, the area-updating data including data specifying an updating area of the screen data displayed on an image-display device and data used for updating part of the screen data displayed in the updating area.

16. The method as claimed in claim 15, further comprising the step of:
setting the correspondence of the screen data to each of said image-display devices and the displaying order of the screen data by following the instruction inputted.

17. A record medium readable by a machine, tangibly embodying a program of instructions executable by the machine to perform method steps for controlling images displayed on a plurality of image-display devices connected to an image-transmitting device through a bus interface, said method steps comprising:
storing a set of screen data, each individual of said set of screen data corresponding to one of said plurality of image-display devices, and further storing a displaying order of said individual of said set of screen data to be displayed on said corresponding image-display devices, in said control device;
selecting the screen data corresponding to each of said image-display devices from among the set of the screen data by following the correspondence between each individual of said set of screen data and respective of said plurality of image display devices and the displaying order;
generating transmission data that each of said image-display devices is to display based on the selected screen data;
transmitting the transmission data to each of said image-display devices through said bus interface;
selecting, by a user, one of the screen data and one of said image-display devices through a graphical user interface (GUI), and directing the selected image-display device to display the selected screen data, wherein the transmission data is generated based on the selected screen data by said selecting step, and then is transmitted to the selected image-display device; and updating the screen data displayed on each of said image-display devices simultaneously by transmitting data including data of a first data type for an entire screen and area updating data of a second data type different from the first data type for updating part of the entire screen, the area-updating data including data specifying an updating area of the screen data displayed on an image-display device and data used for updating part of the screen data displayed in the updating area.

18. The record medium as claimed in claim 17, wherein said method steps further comprises the step of:

setting the correspondence of the screen data to each of said image-display devices and the displaying order of the screen data by following the instruction inputted.

* * * * *